United States Patent
Surazski et al.

(10) Patent No.: US 6,657,983 B1
(45) Date of Patent: Dec. 2, 2003

(54) SCHEDULING OF UPSTREAM TRAFFIC IN A TDMA WIRELESS COMMUNICATIONS SYSTEM

(75) Inventors: Mieczyslaw J. Surazski, Ottawa (CA); James Aweya, Nepean (CA); Imed Frigui, Nepean (CA); Pierre A. Hamel, Aylmer (CA); Delfin Y. Montuno, Kanata (CA); Tong Shan, Ottawa (CA); Bernard Thiboutot, Hull (CA); Genzao G. Zhang, Vanier (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/429,014

(22) Filed: Oct. 29, 1999

(51) Int. Cl.[7] .............................. H04B 7/212; H04J 3/00
(52) U.S. Cl. ...................... 370/337; 370/468; 370/347
(58) Field of Search ................................ 370/338, 468, 370/337, 347, 341, 329, 431, 442

(56) References Cited

U.S. PATENT DOCUMENTS

| | | | | |
|---|---|---|---|---|
| 5,613,198 A | * | 3/1997 | Ahmadi et al. ............. | 370/337 |
| 5,617,467 A | * | 4/1997 | Bacher et al. .............. | 455/466 |
| 5,761,197 A | * | 6/1998 | Takefman ................... | 370/337 |
| 5,917,822 A | * | 6/1999 | Lyles et al. ............... | 370/395.4 |
| 6,016,311 A | * | 1/2000 | Gilbert et al. .............. | 370/280 |
| 6,031,846 A | * | 2/2000 | Gurusami et al. .......... | 370/508 |
| 6,310,886 B1 | * | 10/2001 | Barton ....................... | 370/462 |
| 6,324,184 B1 | * | 11/2001 | Hou et al. .................. | 370/468 |
| 6,349,088 B1 | * | 2/2002 | Ginzboorg et al. ......... | 370/230 |
| 6,418,148 B1 | * | 7/2002 | Kumar et al. ............... | 370/468 |
| 2001/0038620 A1 | * | 11/2001 | Stanwood et al. .......... | 370/336 |

* cited by examiner

*Primary Examiner*—Ajit Patel
*Assistant Examiner*—Chirag Shah

(57) ABSTRACT

A method of allocating bandwidth for transmitting upstream cells from a CPE unit to a BTS. The CPE determines arrival time information associated with each cell and sends arrival time information associated with at least one cell to the BTS. The BTS allocates future bandwidth to the CPE as a function of the arrival time information received from the CPE. For example, the BTS estimates the number of cell arrivals occurring in the current scheduling period based on past cell arrival times. The BTS then sends information to the CPE in which the allocated future bandwidth is specified. Finally, the CPE groups a number of cells into a burst packet occupying the allocated bandwidth and sends the burst packet to the BTS. Rather than respond in a delayed manner to a bandwidth deficiency or surplus at an individual CPE unit, the BTS produces an estimate of a CPE unit's bandwidth demands, resulting in more efficient bandwidth utilization and reduced cell loss ratio.

30 Claims, 12 Drawing Sheets

SCHEDULING OF UPSTREAM TRAFFIC IN A TDMA WIRELESS COMMUNICATIONS SYSTEM

FIELD OF THE INVENTION

The present invention relates generally to digital communications systems, such as broadband wireless access (BWA) communications systems, which are based on the principle of time division multiple access (TDMA) and, more particularly, to a method and apparatus for scheduling upstream traffic in such systems.

BACKGROUND OF THE INVENTION

Over the past few decades, various system architectures have been developed in order to satisfy the public's insatiable thirst for high-rate data communications. These architectures typically employ high-capacity media such as radio, coaxial cable or optical fiber to deliver bi-directional communications services to end customers (subscribers).

In a wireless system, i.e., when radio links are used, it is common to speak of a "cellular" architecture, in which a base transceiver station (BTS) is positioned at the center of a service area (normally called a "cell") and communicates over the air with multiple customer premises equipment (CPE) units located within the cell. Typically, the direction of communication from the BTS to the CPE units is called the "downstream" direction and the reverse direction of communication is referred to as the "upstream" direction.

In order to send separate downstream data streams to multiple CPE units at the same time, the data is usually multiplexed in frequency or in time. Multiplexing in frequency can be achieved by assigning a distinct downstream carrier frequency and a distinct upstream carrier frequency to each CPE unit. More commonly, however, downstream data destined for several CPE units is multiplexed in time and is transmitted at a common "forward" carrier frequency and upstream data originating from several CPE units is multiplexed in time and is transmitted at a common "reverse" carrier frequency. A cellular system that uses time-division multiplexing techniques is usually referred to as a time-division multiple-access (TDMA) cellular system.

In the particular case of a broadband wireless access (BWA) system, multiplexing in time is achieved differently for the two directions of communication. In the downstream direction, for example, the BTS commonly transmits a series of MPEG (Motion Picture Experts Group) packets of length 188 bytes each. The MPEG packets are destined for different CPE units but are received by all CPE units within range, since the radio link is a shared resource. In order to ensure that the MPEG packet destined for a particular CPE unit is processed by that unit but discarded by others, the BTS may encode each packet header with the identity of the intended recipient. Clearly, in this topology, the BTS has control over all transmissions occurring in the downstream direction and is capable of managing the downstream bandwidth allocated to each CPE unit.

In the upstream direction, the time structure of the communications link is divided into scheduling periods having a fixed number of time slots (also called mini-slots) per scheduling period. Since individual CPE units cannot listen to one another's transmissions, they cannot self-regulate their access to the upstream link. Thus, it is necessary for the BTS to centrally manage the allocation of mini-slots to be used by each CPE unit for sending data in the upstream direction. The number of "upstream" mini-slots assigned to each CPE unit as computed by the BTS is sent to each concerned CPE unit, e.g., encoded into the body of an MPEG packet destined for each CPE unit.

The number of mini-slots allocated by the BTS to a given CPE unit for transmission in the upstream direction should satisfy, as precisely as possible, the upstream bandwidth demands of the given CPE unit. Otherwise, the result will be either lost data or bandwidth wastage. For example, if the number of allocated mini-slots is not sufficient to accommodate the upstream bandwidth demands of a given CPE unit, then upstream data may be lost or delayed until a following scheduling period. On the other hand, if an excessive number of mini-slots is assigned to a given CPE unit, the result may be that other CPE units with legitimate bandwidth demands are being deprived of upstream bandwidth which actually remains unused by the given CPE unit.

Thus, it is important for the BTS to have a precise idea of the upstream bandwidth demands of each CPE unit in order to efficiently manage the often scarce bandwidth resources available on the upstream link. Such management is often achieved using a bandwidth allocation algorithm at the BTS.

Most conventional bandwidth allocation algorithms are request-based, meaning that each CPE unit transmits to the BTS a message indicative of the amount of upstream bandwidth that it currently requires. A problem with request-based bandwidth allocation algorithms is that there is usually a delay of at least a few milliseconds associated with generating, transmitting, processing and responding to such a message. Unfortunately, a few milliseconds' delay in deciding whether to increase or decrease the allocated upstream bandwidth can be fatal to the operation of a high-rate communications system, as a large amount of data can be is lost in such a seemingly short amount of time.

Thus, there is a need to provide a mechanism for managing upstream link access, whereby the bandwidth demands of multiple CPE units in a broadband wireless access system can be accurately estimated and whereby the upstream bandwidth can be appropriately allocated by the BTS.

SUMMARY OF THE INVENTION

It is an object of the present invention to mitigate or obviate one or more disadvantages of the prior art.

Accordingly, the BTS of the present invention runs a scheduler which estimates the number of cell arrivals occurring in the current scheduling period based on previous cell arrival time information from each CPE unit. The estimated number of cell arrivals is used by the scheduler to allocate future bandwidth for use by each CPE unit. Rather than respond in a delayed manner to a bandwidth deficiency or surplus at an individual CPE unit, the invention allows the BTS to produce an estimate of a CPE unit's bandwidth demands, resulting in more efficient bandwidth utilization and reduced cell loss ratio.

The invention may be summarized broadly as a method of allocating bandwidth in a communications system, including the steps of receiving a plurality of actual arrival times associated with respective data units; determining, as a function of the received actual arrival times, a number of data units expected to have actual arrival times in a time interval beginning after the most recently received actual arrival time; and allocating sufficient bandwidth to transmit the expected number of data units.

Preferably, the expected number of data units is determined by determining a calibrated arrival time of a subsequent data unit; advancing the calibrated arrival time by constant increments until it is within said time interval; and setting the expected number of data units equal to one plus the number of times that the advanced calibrated arrival time can be further advanced while remaining within said time interval.

Alternatively, the calibrated arrival time could be advanced by constant increments until it is within less than expected number of data units would equal the number of times that the advanced calibrated arrival time can be advanced by said increments while remaining within said time interval.

Preferably, the calibrated arrival time of the subsequent data unit is determined by first comparing the actual arrival time of a previous data unit with a calibrated arrival time of the previous data unit. If the actual arrival time of the previous data unit is within a predetermined range of the calibrated arrival time of the previous data unit, the calibrated arrival time of the subsequent data unit is created by computing a function of the actual arrival time and the calibrated arrival time of the previous data unit and advancing the result by the increment. Otherwise, the calibrated arrival time of the subsequent data unit is created by advancing the actual arrival time of the previous data unit by the increment.

The invention may also be broadly summarized as an article of manufacture, including a computer usable medium having computer readable program code means embodied therein for causing bandwidth to be allocated in a communications system. The computer readable program code means includes computer readable program code means for causing a computer to execute the above-described steps of the invention. Such a computer could be located in a base transceiver station.

Also, the invention may be summarized broadly as a method of allocating bandwidth for transmitting data units from a first communications device (e.g., CPE) to a second communications device (e.g., BTS). The method includes the steps of the CPE determining arrival time information associated with each data unit and sending arrival time information associated with at least one data unit to the BTS; the BTS allocating future bandwidth to the CPE as a function of the arrival time information received from the CPE; the BTS then sending information to the CPE in which the allocated future bandwidth is specified; and the CPE grouping a number of the data units into a burst packet occupying the allocated bandwidth and sending the burst packet to the BTS.

Preferably, bandwidth is allocated as a number of time slots to be used by the CPE in a future scheduling period. Preferably, the step of the BTS allocating future bandwidth includes the BTS estimating the number of data units arriving at the CPE in the current scheduling period and determining the number of time slots required to transmit a burst packet encapsulating the estimated number of data units.

The invention can also be broadly summarized as a scheduler, including a calibration unit and an unsolicited bandwidth allocation unit connected to the scheduler. The calibration unit is operable to receive arrival time information associated with a plurality of data units and to determine, as a function of the arrival time information, a calibrated arrival time for a next data unit. The unsolicited bandwidth allocation unit is operable to determine the number of data units expected to arrive in a time interval and to allocate sufficient bandwidth to accommodate the expected number of data units.

Also, the invention may be summarized broadly as a communications device including a data unit extraction module for extracting the actual arrival time associated with each of a plurality of data units; and a scheduler connected to the data unit extraction module, for receiving the actual arrival times from the data unit extraction module, for determining, as a function of the actual arrival times, a number of data units expected to arrive in a time interval beginning after the most recently received actual arrival time, and for allocating sufficient bandwidth to transmit the expected number of data units.

The invention could also be broadly summarized as a communications device, including a frame create module connected to a burst create module. The frame create module is operable to receive data units from a data unit generation module, to determine arrival time information associated with each data unit, to organize the data units into frames and to encode the frame with the arrival time information of each data unit so organized.

For its part, the burst create module is operable to receive, during each of a plurality of successive scheduling periods, instructions to transmit frames during a specified set of time slots in a specified scheduling period; to create a burst packet from the frames (where the burst packet occupies the number of time slots in the specified set of time slots); to arrange the burst packet to fit into the specified set of time slots; and to transmit the burst packet in the specified set of time slots in the specified scheduling period.

BRIEF DESCRIPTION OF THE DRAWINGS

These and other aspects and features of the present invention will become apparent to those of ordinary skill in the art upon review of the following description of specific embodiments of the invention in conjunction with the accompanying drawings, in which.

DETAILED DESCRIPTION OF THE PREFERRED EMBODIMENTS

Figure 1:
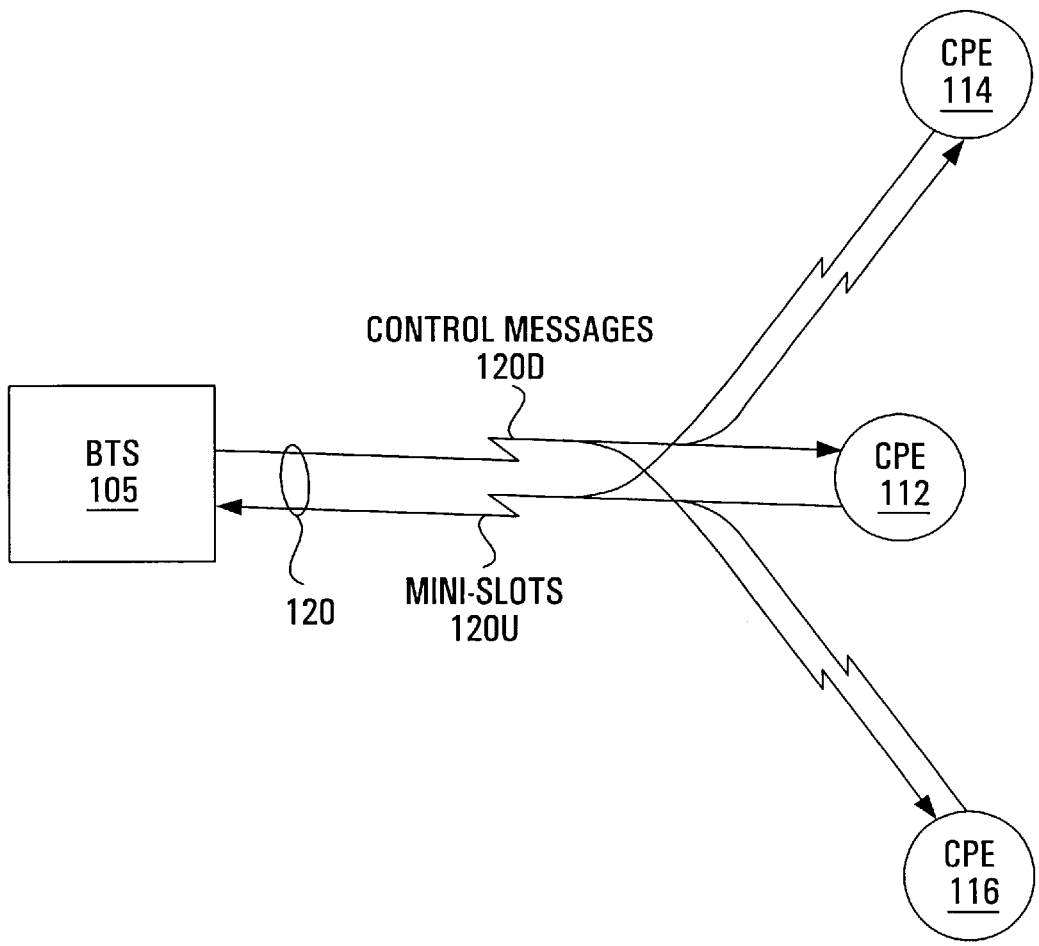
FIG. 1 shows a base transceiver station (BTS) engaged in broadband wireless communication with a customer premises equipment (CPE) unit.

With reference to FIG. 1, there is shown a broadband wireless access (BWA) communications system 100 including a base transceiver station (BTS) 105 communicating with a plurality of customer premises equipment (CPE) units 112, 114, 116 via a communications link 120.

The communications link 120 is preferably a wireless link and can be conceptually represented as consisting of a downstream link 120D and an upstream link 120U. In a BWA scenario, the same forward (downstream) carrier frequency and the same reverse (upstream) carrier frequency on link 120 are used by the base station to communicate with all CPE units 112, 114, 116.

For transmission in the downstream (BTS to CPE) direction, the BTS 105 sends downstream packets to the CPE units 112, 114, 116. These downstream packets may have any given size but are preferably 188 bytes in length. The information carried by the downstream packets includes downstream user data, as well as control information for allocating upstream bandwidth.

According to the preferred embodiment of the present invention, transmission time in the upstream (CPE to BTS) direction is subdivided into contiguous scheduling periods of equal duration, with each scheduling period preferably having a length of 1 millisecond (ms), although other durations are possible. The BTS and CPE units share a synchronized time base. Thus, the beginning (and end) of each scheduling period is known to the BTS 105 and each CPE unit.

During each scheduling period, each CPE unit 112 transmits one so-called "burst packet" to the BTS 105. The size of a burst packet is variable and can be defined by the number of so-called mini-slots occupied by that burst packet. A mini-slot is a portion of a scheduling period and preferably lasts $1/160^{th}$ of a scheduling period, e.g., 6.25 microseconds ($\mu$s), although other durations are possible. The number of mini-slots occupied by a burst packet and the position of those mini-slots within the respective scheduling period are obtained from the BTS 105 via a control message embedded in a previous downstream packet. In other words, from the point of view of an individual CPE unit, each scheduling period is "managed" by a previously received control message.

The BTS 105 is programmed to allocate mini-slots in such a way that within a single scheduling period, different CPE units transmit their own burst packets in non-overlapping mini-slots. In order to improve bandwidth efficiency, reduce cell delay variations (jitter) and reduce the cell loss rate relative to conventional methods, it is of importance that the BTS 105 be capable of sufficiently accurately predicting the bandwidth demands of each individual CPE unit.

Figure 2:
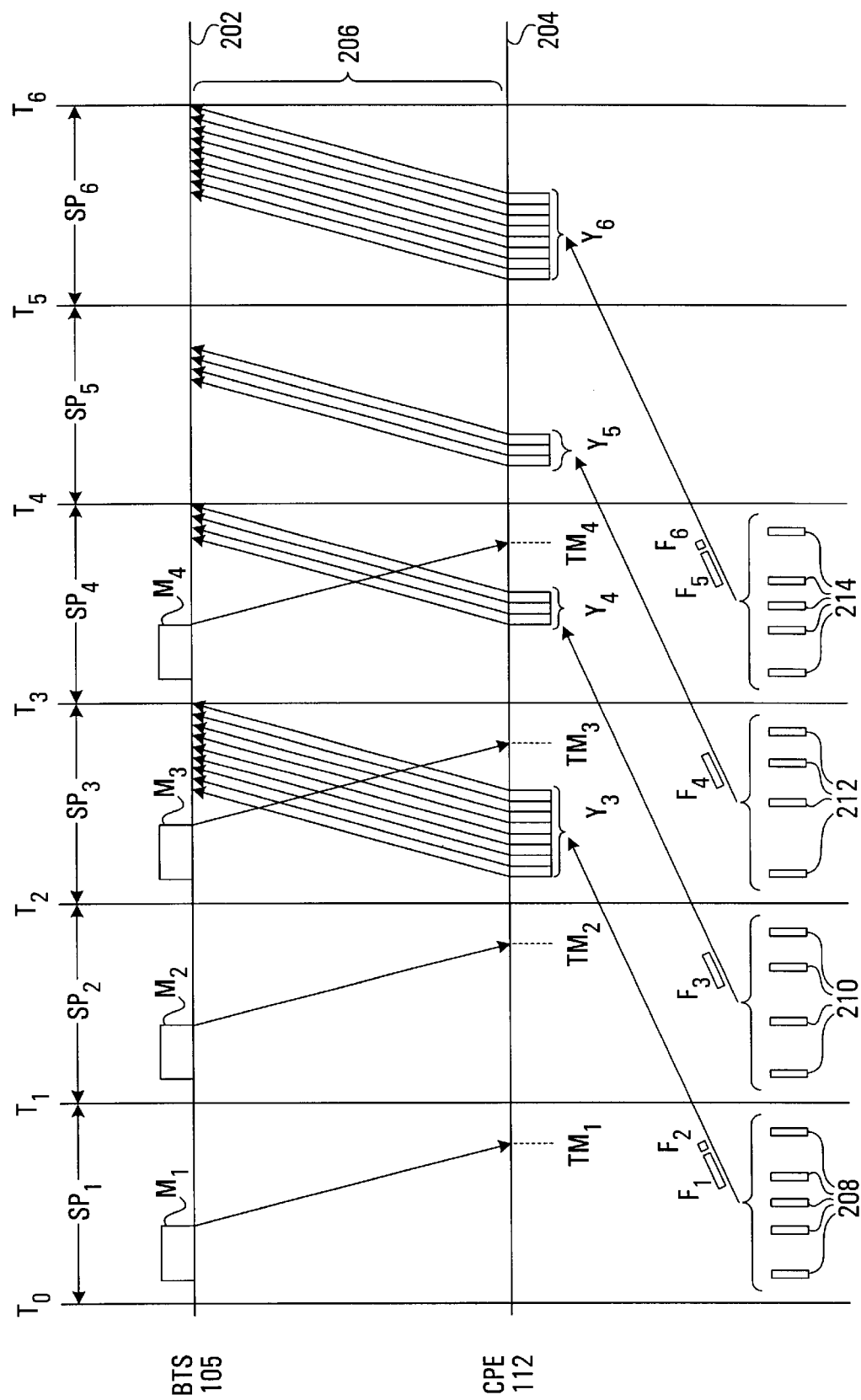
FIG. 2 shows, as a function of time, the exchange of control messages and mini-slots between the BTS and the CPE unit of FIG. 1.

With reference now to FIG. 2, the relationship between the timing of a control message transmitted by the BTS 105 and the scheduling period managed by that control message is described. Thus, FIG. 2 shows how transmission time is separated into contiguous scheduling periods $SP_1$–$SP_6$ of equal duration, beginning at times $T_0$–$T_5$, respectively, and ending at times $T_1$–$T_6$, respectively. Although scheduling periods are primarily used by CPE units in the context of upstream data transmission, the start and end of each scheduling period is known at the BTS 105 by virtue of the synchronized time base shared by the BTS 105 and the CPE units.

An upper horizontal axis 202 is used to conceptually represent activity at the BTS 105 and a lower horizontal axis 204 is used to conceptually represent activity at a CPE unit such as CPE unit 112. An area 206 between the upper horizontal axis 202 and the lower horizontal axis. 204 represents the air interface between the BTS 105 and CPE unit 112.

In the downstream direction, the BTS 105 sends control messages $M_1$–$M_4$ to CPE unit 112 during scheduling periods $SP_1$–$SP_4$. Control messages $M_1$–$M_4$ arrive at CPE unit 112 at times $TM_1$–$TM_4$, respectively. If the delay introduced by the air interface 206 is sufficiently small and if a control message is transmitted sufficiently close to the start of the respective scheduling period, then the control message will be received in the same scheduling period as that during which it was sent. This is hereinafter assumed to be the case.

In the upstream direction, CPE unit 112 transmits burst packets $Y_3$–$Y_6$ (each occupying multiple time slots called mini-slots) during scheduling periods $SP_3$–$SP_6$, respectively. Burst packets $Y_3$–$Y_6$ are constructed during scheduling periods $SP_2$–$SP_5$, respectively, from upstream user data arriving during scheduling periods $SP_1$–$SP_4$, respectively. The size of each burst packet (in terms of the number of mini-slots that it occupies) and the assignment of mini-slots within the scheduling period is dictated by a previously received control message. More specifically, the number and position of the mini-slots that make up burst packet $Y_x$ transmitted upstream during scheduling period $SP_x$ are managed by control message $M_{x-2}$ received during scheduling period $SP_{x-2}$.

Clearly, the best usage of upstream bandwidth occurs when the number of mini-slots transmitted upstream by CPE unit 112 during scheduling period $SP_x$ is exactly sufficient to accommodate all user-generated data having arrived at the CPE unit during scheduling period $SP_{x-2}$. It follows that upstream bandwidth will be used most efficiently when control message $M_{x-2}$, which manages scheduling period $SP_x$, contains an accurate prediction of the amount of user data having arrived from the end user in scheduling period $SP_{x-2}$.

In some situations, it is possible to accurately predict the upstream bandwidth demands of a CPE unit. However, certain types of data streams do not have easily predictable bandwidth demands. An example of the latter type of data stream is that produced by ATM Adaptation Layer 1 (AAL1) or ATM Adaptation Layer 5 (AAL5) software as described in ANSI standard T1.630 and hereby incorporated by reference herein.

AAL1 software is commonly used to produce a constant bit rate (CBR) ATM cell stream from a synchronous data stream, while AAL5 software is commonly used to produce a constant bit rate (CBR) ATM cell stream from a stream of Ethernet frames. In each case, the resulting ATM cell stream is jittered. That is to say, although the average number of cells produced per second is constant, each individual cell is output at a time which may deviate from an ideal output time by up to a so-called jitter bound. Hence, the actual number of cells output per scheduling period will deviate from one scheduling period to the next.

Figure 3:
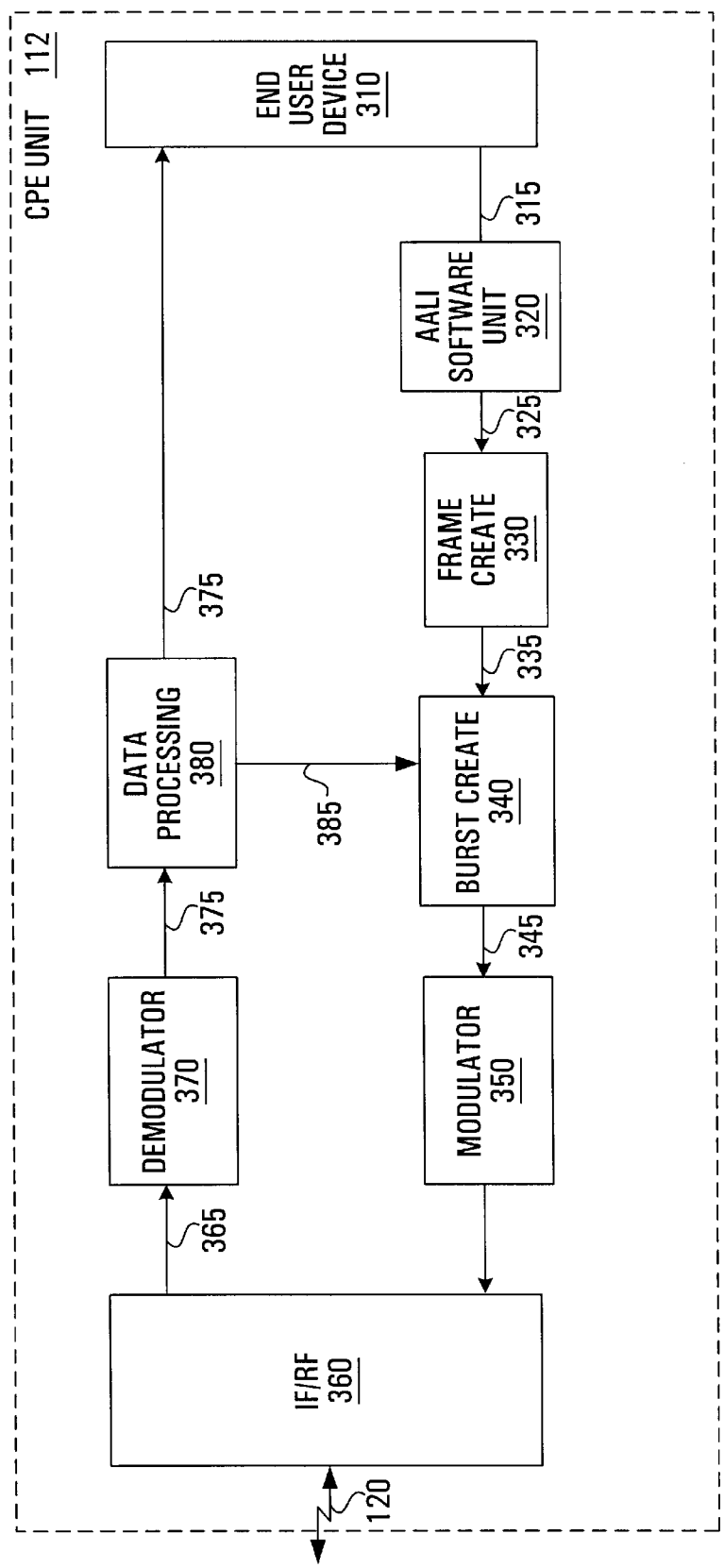
FIG. 3 is a block diagram showing various functional elements of a CPE unit.

Reference is now made to FIG. 3, wherein is shown a CPE unit 112 that uses an AAL1 software unit 320 to produce a jittered upstream cell stream which does not always require the same number of mini-slots in each scheduling period. When CPE units such as the one illustrated in FIG. 3 are employed, it is necessary to execute an inventive scheduling algorithm at the BTS 105 in order to efficiently utilize the available upstream bandwidth.

CPE unit 112 comprises an intermediate frequency/radio frequency (IF/RF) interface unit 360, which receives downstream RF signals from the BTS 105 over downstream link 120D and transmits upstream RF signals to the BTS 105 over upstream link 120U. The IF/RF interface unit 360 can be of standard design and comprises circuitry such as antennas, filters, oscillators, digital-to-analog converters and analog-to-digital converters. These components cooperate to provide down-conversion of the downstream RF signal to a downstream IF signal and up-conversion of an upstream IF signal to the upstream RF signal.

The downstream IF signal is fed to a demodulator 370 along a data link 365. The demodulator 370 comprises circuitry or software for demodulating the downstream IF signal into a downstream bit stream. The demodulation scheme is preferably the inverse of quadrature amplitude modulation (QAM), although other demodulation schemes could be used. The downstream bit stream is fed to a data processing unit 380 along a data link 375.

The downstream bit stream produced by the modulator 370 comprises a sequence of packets transmitted by the BTS 105. An example of such a downstream packet is a 188-byte MPEG packet. Some of these packets are destined for CPE unit 112 and other packets are destined for other CPE units. The demodulator 370 preferably comprises circuitry or software for extracting and forwarding to the data processing unit 380 only those downstream packets which are in fact intended for CPE unit 112.

The downstream packets received by the data processing unit 380 include user data packets (destined for an end user device 310) as well as control messages from the BTS 105. One type of control message has already been discussed, namely, the type of control message which specifies the number of mini-slots to be used by CPE unit 112 for transmitting upstream traffic during an upcoming scheduling period and the position of those mini-slots within the respective scheduling period.

The data processing unit 380 comprises circuitry or software for recognizing this type of control message and extracting and forwarding its contents (i.e., the specified number of mini-slots per burst packet and the specified position of the mini-slots within the respective scheduling period) to a burst create module 340 along a control link 385. In addition, the data processing unit 380 comprises circuitry or software for recognizing and forwarding user data to the end user device 310 along a data link 375.

In the reverse direction, the end user device 310 produces an upstream bit stream along a data link 315. In a BWA scenario, the end user device 310 could be a set of telephones or computers, for example. The upstream bit stream on data link 315 may be a DS1 or DS3 stream or it may be a sequence of Ethernet frames. In the interest of simplicity, it will be assumed that the data stream on data link 315 is a synchronous DS1 data stream providing a constant data rate.

Upon entry into CPE unit 112, the upstream bit stream on link 315 is fed to the AAL1 software unit 320. The AAL1 software unit 320 creates a jittered CBR ATM cell stream from the synchronous DS1 bit stream arriving on data link 315. It should be understood that software units other than an AAL1 software unit could be used to produce a jittered cell stream. Also, a jittered ATM cell stream could be generated at the source, without software intervention.

The jittered ATM cell stream output by the AAL1 software unit 320 is fed to a frame create module 330 along a data link 325. The frame create module 330 comprises circuitry or software for creating upstream frames as a function of cells received from the CES block 320 along data link 325. Frames produced by the frame create module 330 are forwarded to the burst create module 340 along a data link 335.

The burst create module 340 comprises circuitry or software for grouping one or more upstream frames arriving from the frame create module 330 into a burst packet based on control information. This control information, such as the allowable size of the burst packet (in terms of the number of mini-slots occupied by the burst packet) and the position of those mini-slots within the respective scheduling period, is received from the data processing unit 380 along control link 385. The resulting burst packet is then fed on a per-mini-slot basis to a modulator 350 along a data link 345.

The modulator 350 comprises circuitry or software for modulating the mini-slots received from the burst create module 340 along data link 345. The modulator 350 feeds a digitally modulated IF signal to the IF/RF interface module 360. Preferably, the modulation scheme used by the modulator 350 is n/4-DQPSK (differential quadrature phase-shift keying), although other modulation schemes could be employed. The modulation scheme used by the modulator 350 may be different from the inverse of the demodulation scheme used by the demodulator 370.

Figure 4:
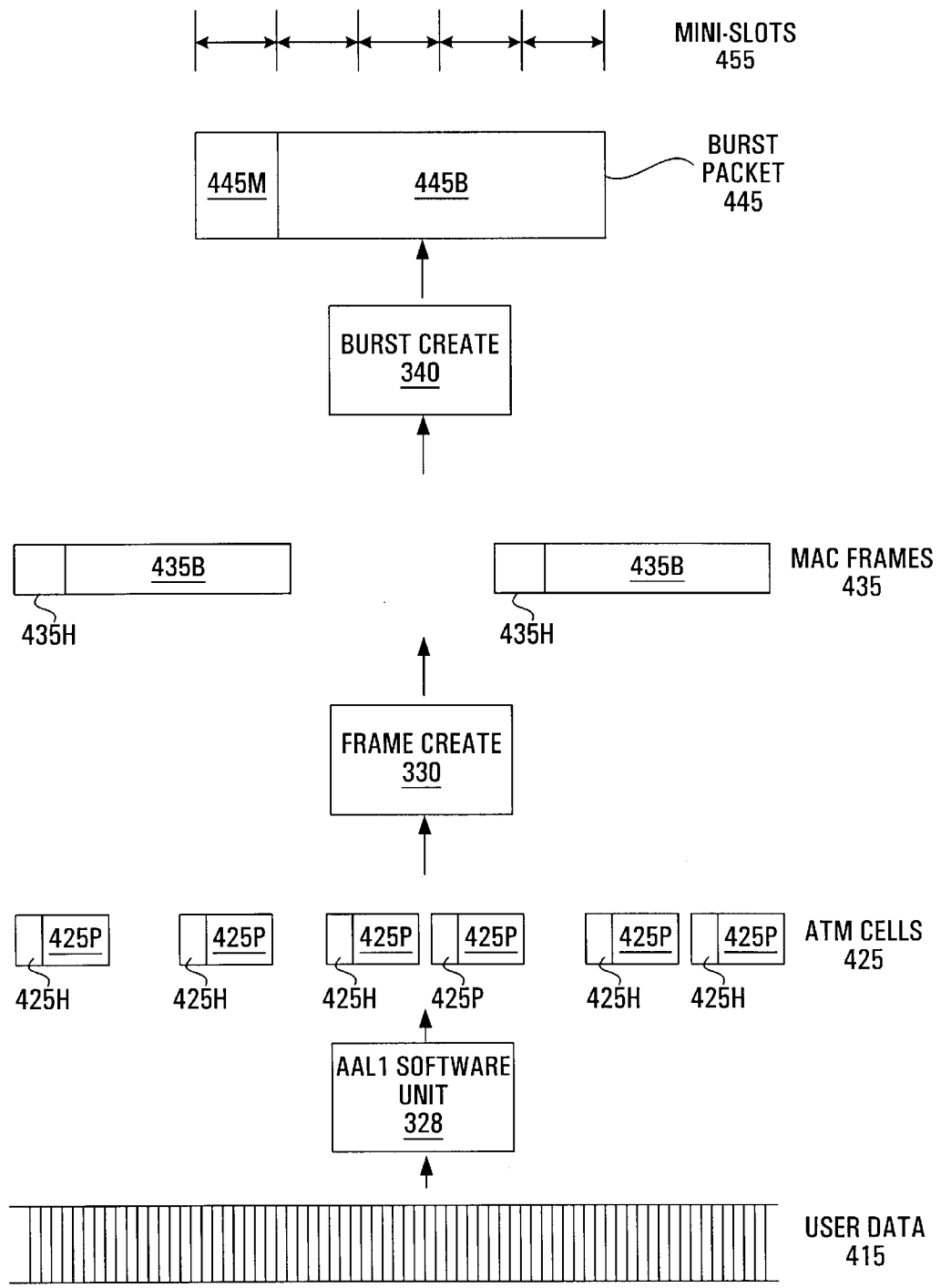
FIG. 4 shows the structure of upstream data, cells, frames and mini-slots transmitted by the CPE unit to the BTS.

Operation of CPE unit 112 is now described with continued reference to FIG. 3 and with additional reference to FIG. 4. In operation, the end user device 310 generates an upstream bit stream, for example synchronous data stream 415, which is fed to the AAL1 software unit 320 along data link 315. The AAL1 software unit 320 produces a jittered stream of data units 425, which jittered stream is fed to the frame create module 330 along data link 325.

Preferably, the data units 425 are ATM cells, each consisting of a header 425H and a payload 425P. The header 425H typically contains information such as generic flow control (GFC), virtual path identifier (VPI), virtual channel identifier (VCI), payload type (PT), call loss priority (CLP) and header error check (HEC). On the other hand, the payload 425P is usually entirely devoted to user data. However, when AAL1 circuit emulation software is employed, one or more payload bytes are used for control of segmentation and re-assembly (SAR).

For a given end-to-end connection, the ATM cells 425 produced by AAL1 software unit 320 have a jittered constant bit rate (CBR) characteristic. That is, the average interval separating the ATM cells is constant and is equal to the inverse of a peak cell rate (PCR), which is constant. However, due to the nature of the AAL1 circuit emulation software, ATM cells exiting the AAL1 software unit 320 do not leave at precisely the peak cell rate. Rather, the actual departure time of each individual ATM cell may deviate from an ideal departure time by up to an amount known as the "jitter bound". The jitter bound usually has a known constant value, such as 200 microseconds.

Thus, each ATM cell 425 exiting the AAL1 software unit 320 will arrive at the frame create module 330 at a time which may deviate from an ideal arrival time (although never by more than the jitter bound). Thus, the number of ATM cell arrivals at the frame create module 330 in a given scheduling period varies from one scheduling period to the next. This phenomenon is illustrated in FIG. 2, where ATM cell arrivals at the frame create module 330 during scheduling periods $SP_1$–$SP_4$ are depicted as respective sets of rectangles 208, 210, 212, 214. It can be seen that five cells arrive during each of scheduling periods $SP_1$ and $SP_4$, whereas only four cells arrive during each of scheduling periods $SP_2$ and $SP_3$.

The frame create module 330 accepts jittered ATM cells 425 from the AAL1 software unit 320 and packages them into frames 435, such as medium access control (MAC) frames, each with a header 435H and a body 435B.

With reference again to FIG. 2, there is shown a set of frames produced by the frame create module 330 and sent to the burst create module 340 for transmission to the BTS 105. Specifically, during scheduling period $SP_1$, the frame create module 330 constructs two frames $F_1$, $F_2$ from five received ATM cells 208. Frames $F_1$ and $F_2$ are sent to the burst create module 340. Similarly, one frame $F_3$ is created from four ATM cells 210 received during scheduling period $SP_2$, one frame $F_4$ is created from four ATM cells 212 received during scheduling period $SP_3$ and two frames $F_5$, $F_6$ are created from 5 ATM frames 214 received during scheduling period $SP_4$.

Figure 5:
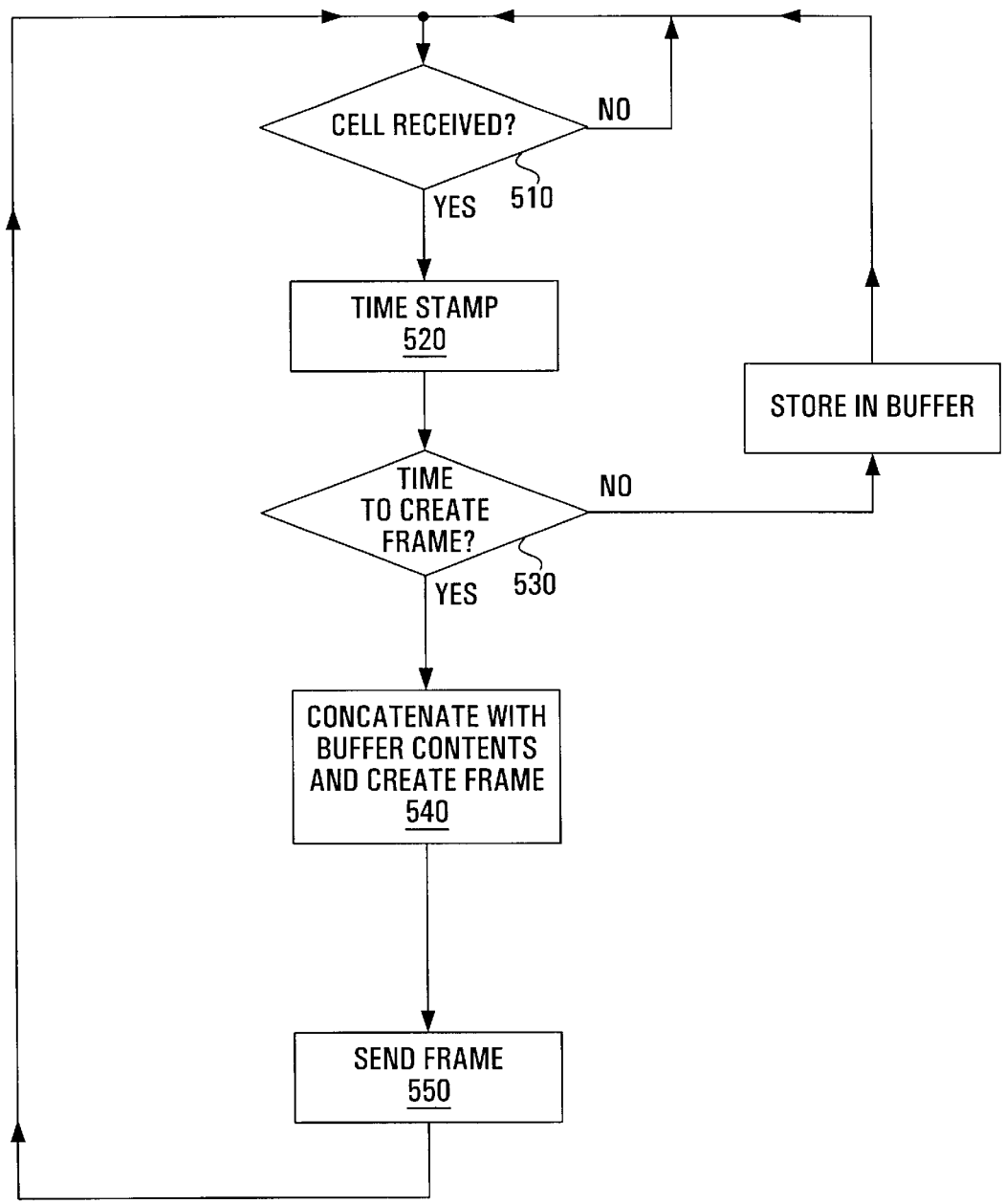
FIG. 5 is a flowchart illustrating operation of a frame create module in the CPE unit of FIG. 3.

Operation of the frame create module 330 is now described in more detail with reference to the flowchart in FIG. 5. If the frame create module 330 is implemented as a software program in the "C" language, the flowchart in FIG. 5 could represent the program flow of the "main" function.

At step 510, the frame create module 330 checks to see whether a new ATM cell has been received from the AAL1 software unit 320. If so, the frame create module 330 proceeds to step 520; otherwise, it returns to step 510.

At step 520, the frame create module 330 determines the arrival time of the new ATM cell as given by the internal system clock which is synchronized to a common time reference. The frame create module 330 then time stamps the received ATM cell with this arrival time. Preferably, time stamping is achieved by encoding the arrival time of the cell into its header. To this end, some header fields, such as VPI and VCI, may have to be shortened in order to accommodate insertion of the arrival time. Alternatively, a super-cell could be created, whereby the recorded arrival time is appended to the front of the header or to the back of the payload of the ATM cell.

At step 530, the frame create module 330 determines whether it is time to create a frame. The time to create a frame may be reached when the current scheduling period has ended. Alternatively, the time to create a frame may be signalled by the data processing unit 380 via a control link (not shown) after decoding a control message received from the BTS 105. If the time to create a frame has been reached, then the frame create module 330 proceeds to step 560; otherwise, it stores the most recently received and time stamped ATM cell in a local buffer and returns to step 510.

At step 540, the frame create module 330 concatenates the most recently received and time stamped ATM cell with the contents of the buffer and creates a frame, such as a medium access control (MAC) frame. The frame create module 330 fills the MAC header with information such as the frame length and fills the MAC body with the concatenated ATM cells. The number of ATM cells that are placed into a single MAC frame is variable and can be controlled either autonomously at the CPE unit 112 or remotely by the BTS 105. An example of autonomous control is the creation of a frame from a single cell in the buffer in order to avoid delaying the cell by more than a maximum number of microseconds.

Finally, at step 550, any MAC frame created at step 560 in the just described manner is sent to the burst create module 340 along data link 335.

At the burst create module 340, during each scheduling period, one burst packet 445 is built from one or more MAC frames 435 received from the frame create module 330. Each burst packet 445 has a header 445H and a body 445B. The header 445H contains synchronization information, while the body 445B contains one or more MAC frames 435. The entire burst packet 445 can be viewed as consisting of a number of mini-slots 455.

The number of mini-slots 455 which make up the burst packet 445 is specified by control information received from the data processing unit 380. Thus, the number of MAC frames (and hence the number of ATM cells) which are transmitted upstream during a scheduling period is managed by the BTS 105.

Also, the positions of the mini-slots 455 within the scheduling period are specified by control information received from the data processing unit 380. Specifically, the burst create module 340 receives mini-slot position information from the data processing unit 380 and ensures that the burst packet sent to the modulator 350 occupies the appropriate mini-slots.

In the general case, the size and positioning of a burst packet to be transmitted by the CPE unit 112 during scheduling period $SP_{i+2}$ is managed by control message $M_i$ transmitted by the BTS 105 during scheduling period $SP_i$. This difference of two scheduling periods is preferred, since it allows the frames to be created during scheduling period Clearly, the bandwidth usage efficiency, the variation in cell delay and the cell loss ratio will depend on the accuracy with which the control message responsible for managing scheduling period $SP_{i+2}$ has estimated the number of ATM cells arriving at the frame create module 330 during scheduling period $SP_i$. According to the present invention, a high level of estimation accuracy is achieved by running an inventive scheduling algorithm in the BTS 105, as will be described herein below, following a description of the BTS itself.

Figure 6:
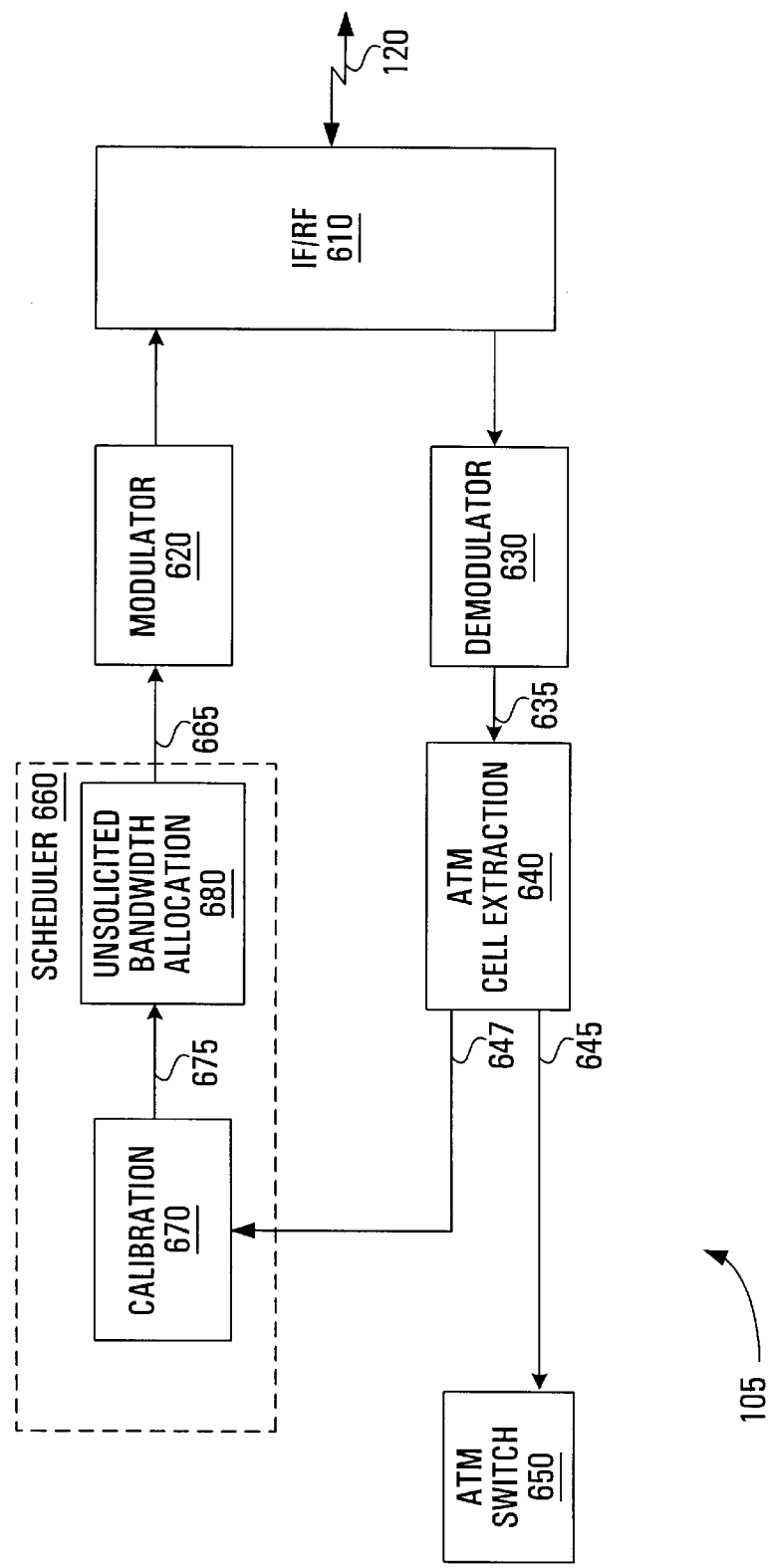
FIG. 6 is a block diagram showing various functional elements of a BTS, including a scheduler.

Reference is made to FIG. 6, which shows an internal block diagram of the BTS 105. An IF/RF interface unit 610 interfaces with multiple CPE units, including CPE unit 112, over a wireless link 120. The IF/RF unit 610 comprises various processing sections for exchanging signals with the different CPE units but in the interest of simplicity only one such section is shown in FIG. 6. The IF/RF interface unit 610 can be similar to the IF/RF interface unit 360 in CPE unit 112 except that the forward and reverse carrier frequencies could be interchanged. The IF/RF interface unit 610 accepts a downstream modulated IF signal from a modulator 620 and provides an upstream modulated IF signal to a demodulator 630.

The demodulator 630 comprises circuitry or software for demodulating the upstream IF signal transmitted by CPE unit 112 into a bit stream. Since the modulator 350 in CPE unit 112 is preferably a π/4-DQPSK modulator, the demodulator 630 in the BTS 105 is preferably a π/4-DQPSK demodulator. Of course, other modulation and corresponding demodulation schemes could be used. The bit stream produced by the demodulator 630 contains upstream burst packets, each comprised of a plurality of mini-slots, which burst packets are provided to an ATM cell extraction module 640 along a data link 635.

The ATM cell extraction module 640 comprises circuitry or software for extracting ATM cells from the upstream burst packets received from the demodulator 630 on data link 635. This involves a two-stage process, in which MAC frames are first reconstructed, following which ATM cells are extracted from the bodies of the reconstructed MAC frames. The extracted ATM cells are provided along a data link 645 leading to equipment such as an ATM switch 650.

In addition, the ATM cell extraction module 640 comprises circuitry or software for extracting the time stamp of each ATM cell (as encoded by the frame create module 330 in CPE unit 112) and to provide these time stamps to a scheduler 660 along a control link 647.

The scheduler 660 is preferably a software entity running on a processor within the BTS 105. (Other centralized software entities, such as a connection manager, exist within the BTS 105 but are not shown for simplicity.) The scheduler 660 consists of two main functional entities, namely a calibration unit 670 and an unsolicited bandwidth allocation unit 680. The calibration unit 670 and the unsolicited bandwidth allocation unit 680 could be software subroutines or functional modules of the same software program.

In general terms, the scheduler 660 is programmed: (i) to process the ATM cell arrival times received from the ATM cell extraction module 640 along control link 647; and (ii) to produce a downstream control message for each CPE unit at each scheduling period. Each control message is aimed at managing upstream bandwidth allocation for a particular CPE unit during a future scheduling period (preferably two scheduling periods in advance of the current scheduling period) and identifies the mini-slots to be used by the CPE unit for upstream transmission during that future scheduling period.

Control messages created by the scheduler 660 are sent to the modulator 620 along a control link 665. The modulator 620 comprises circuitry or software for processing the control messages and generating a downstream IF signal according to any suitable modulation scheme, such as QAM. Of course, the modulation scheme used by the modulator 620 should be the inverse of the demodulation scheme used by the demodulator 370 in CPE unit 112. The modulator then sends the modulated control message to CPE unit 112 via the IF/RF interface unit 610.

The modulated control message could share the same communications link 120 as downstream user data destined for CPE unit 112. However, the flow of downstream user data is not shown, as the present invention is mostly concerned with controlling the flow of upstream user data.

Operation of the BTS 105 is now described with continued reference to FIG. 6. Firstly, it is recalled that the ATM cell extraction module 640 provides two information streams along two links 645, 647. One information stream (fed to the ATM switch 650 along data link 645) contains ATM cells reconstructed from upstream burst packets received from the demodulator 630 along data link 635. The other information stream (fed to the calibration unit 670 along control link 647) contains arrival time information pertaining to each cell that is forwarded to the ATM switch 650. As previously discussed with reference to step 520 executed by the frame create module 330 in CPE unit 112, arrival time information for a particular cell could be contained in the cell's header or in a bit pattern appended to the cell.

The calibration unit 670 provides a continuously updated calibrated arrival time which is updated each time a new arrival time is received from the ATM cell extraction module 640. The calibrated arrival time-is-an estimate of the next arrival time to be supplied by the ATM cell extraction module 640. The calibrated arrival time is fed to the unsolicited bandwidth allocation unit 680 along a control link 675 intended to represent an exchange of software parameters.

In order to understand how the calibration unit 670 operates, it is recalled that the characteristics of the cell stream produced by the software unit 320 in CPE unit 112 are such that the actual cell arrival time (denoted $A_k$) of a $k^{th}$ cell is within the jitter bound of an ideal arrival time (denoted $Q_k$) for that $k^{th}$ cell. Furthermore, the ideal arrival times of adjacent cells are separated by the mean period between cells, which equals 1/PCR seconds (where PCR stands for the peak cell rate). Although the ideal arrival times $Q_k$ are not known, both the jitter bound (denoted JB) and 1/PCR are known to the calibration unit 670.

Thus, based on the actual arrival time $A_k$ of the $k^{th}$ cell, on the jitter bound (denoted JB) and on the average interval between cell arrivals (denoted 1/PCR), the calibration unit 670 produces a calibrated arrival time (denoted $P_{k+1}$) for the next cell, i.e., the $k+1^{th}$ cell. Operation of the calibration unit 670 is now described in more detail with reference to the flowchart in FIG. 7.

At step 710, which represents the state of the calibration unit 670 at startup, two software variables are initialized. The first variable is denoted k and represents the next upstream ATM cell whose arrival time information is to be extracted by the ATM cell extraction module 640. The value of k is initialized to "1", meaning that the arrival time information of the $1^{st}$ ATM cell is yet to be received from the ATM cell extraction module 640.

The second software variable to be initialized is $P_1$, which represents the calibrated arrival time of the $1^{st}$ ATM cell at the frame create module 330. The value of $P_1$ can be set to any default constant such as $T_0$, representing the beginning of the first scheduling period $Sp_0$.

At step 720, the calibration unit 670 waits to receive the arrival time $A_k$ of the $k^{th}$ cell from the ATM cell extraction module 640. The first pass through step 730 will cause the calibration unit 670 to read the arrival time Al of the $1^{st}$ ATM cell.

At step 730, $A_k$ is compared to $P_k$ in order to see whether their difference is greater than 1/PCR. If this is the case, then one or more cells may have been lost prior to receipt of the $k^{th}$ cell. This results in the calibration unit 670 declaring a "cell loss" condition to other parts of the BTS 105. In order to recuperate from a wide discrepancy between $A_k$ and $P_k$, $P_k$ is incremented by 1/PCR one or more times until it is within 1/PCR seconds of $A_k$.

At step 740, $A_k$ and $P_k$ are processed in order to determine $P_{k+1}$. In other words, an estimate of the arrival time of the next ATM cell is provided. In a first instance, therefore, the calibration unit 670 processes the calibrated arrival time $P_1$ of the $1^{st}$ cell in light of the recorded arrival time $A_1$ of the $1^{st}$ cell in order to derive the calibrated arrival time $P_2$ of the $2^{nd}$ cell.

There are many ways of computing a good estimate of the arrival time of the next $(k+1^{th})$ cell. One of these consists of performing the following computation:

$$P_{k+1}=N_k+1/\text{PCR}, \qquad (1)$$

$$(A_k+P_k)/2, \text{ if } |A_k-P_k|<2\times JB$$

where $N_k=A_k$, otherwise

In plain language, if the difference between the actual and calibrated arrival times of the previous cell is small, then the calibrated arrival time of the next cell is equal to their mean incremented by the average interval between cell arrival times. On the other hand, if the difference between the actual and calibrated arrival times of the previous cell is large, then the calibrated arrival time of the next cell is simply equal to the actual arrival time of the previous cell incremented by the average interval between cell arrival times.

Finally, at step 750, the cell counter variable k is incremented and the algorithm returns to step 720.

Figure 7:
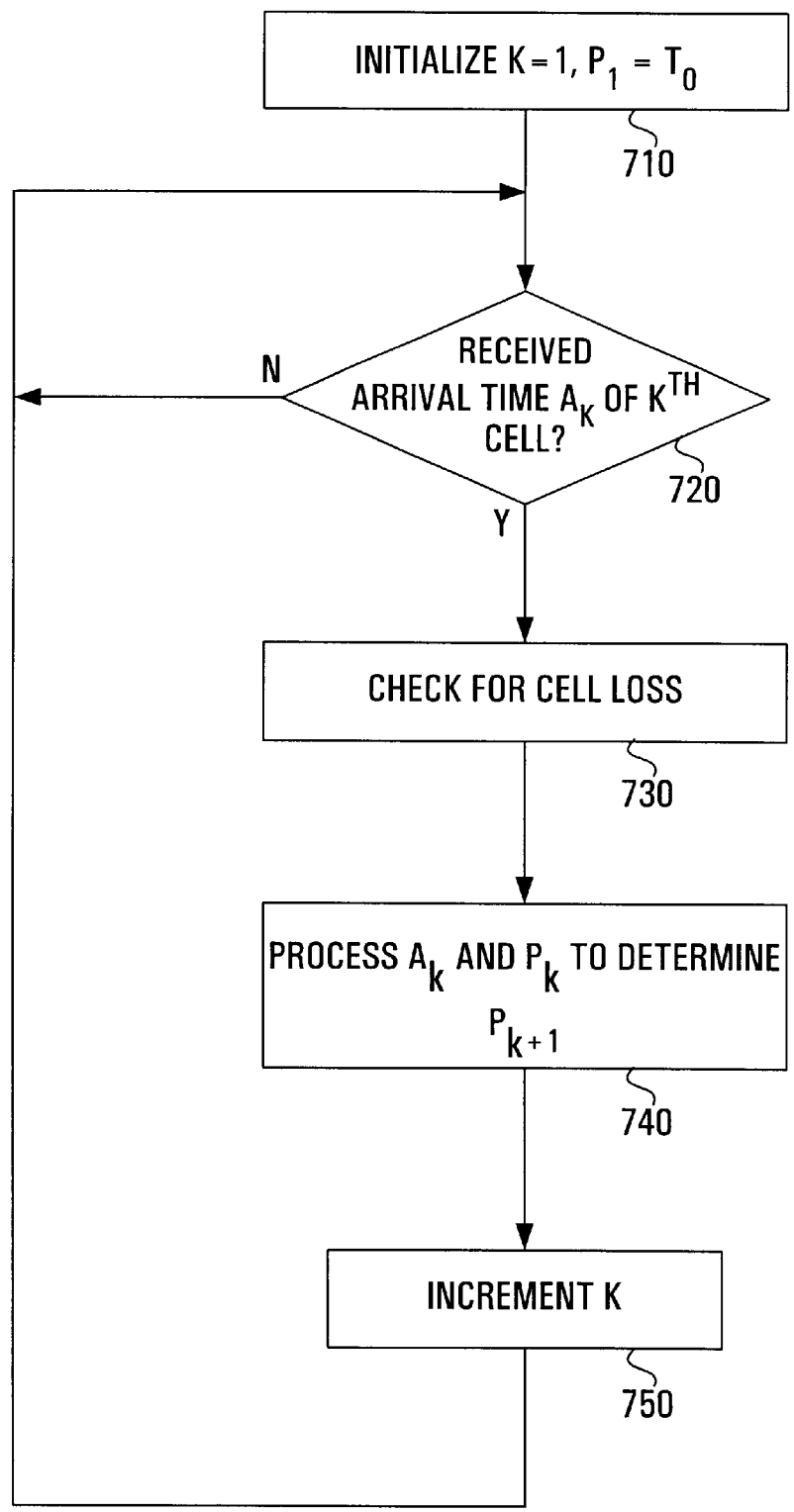
FIG. 7 is a flowchart illustrating operation of a calibration unit within the scheduler of FIG. 6, according to the preferred embodiment of the present invention.
Figure 8:
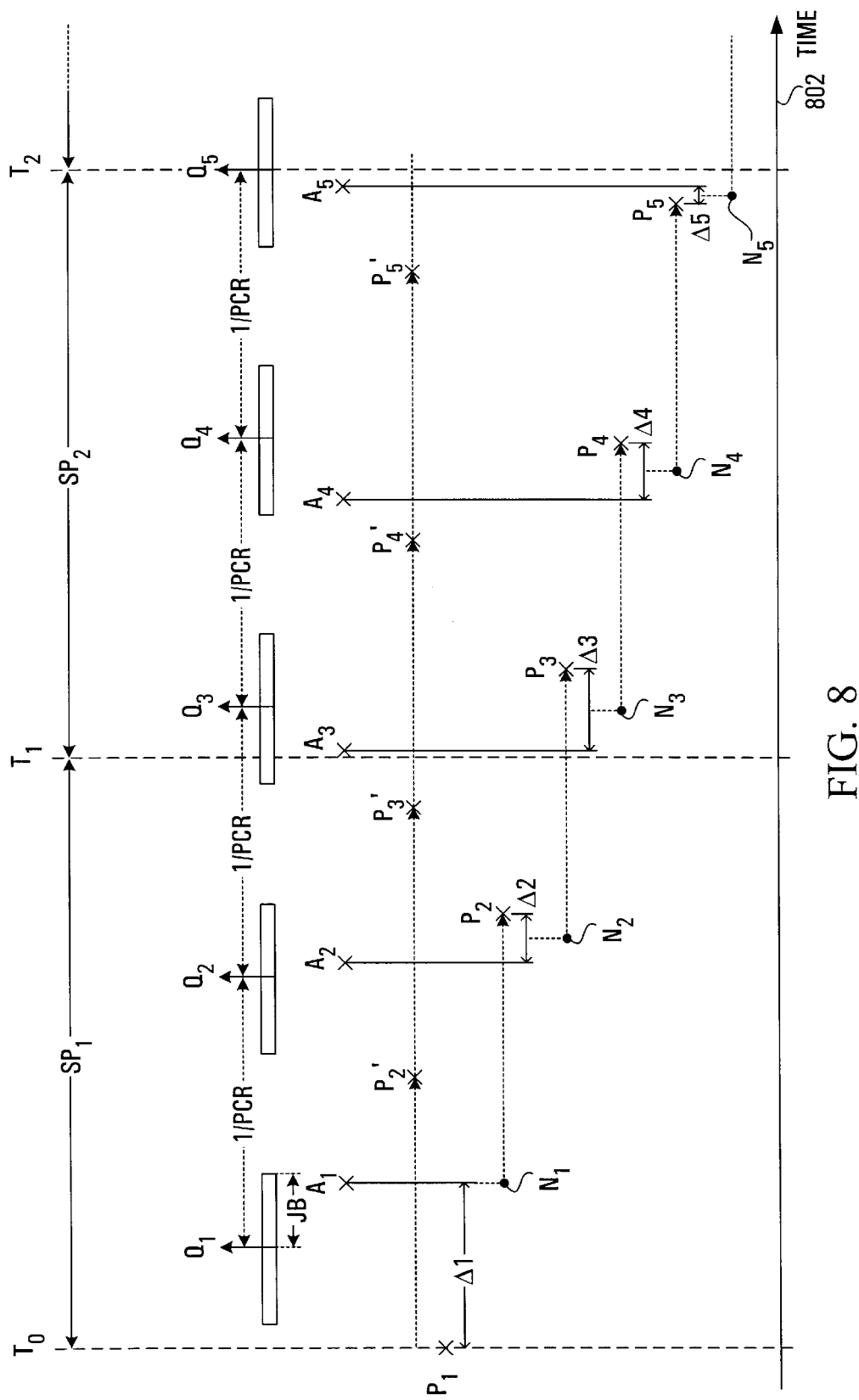
FIG. 8 is a time line that tracks various steps in the execution of the flowchart of FIG. 7 for a particular set of conditions.

Reference is now made to FIG. 8, in which is shown how a series of calibrated arrival times $P_k$ is generated from a series of actual arrival times $A_k$ according to the calibration algorithm of FIG. 7 as executed by the calibration unit 670 in the scheduler 660.

Firstly, it is helpful to visualize time as being represented on a horizontal axis 802 and broken down into contiguous scheduling periods $SP_1$, $SP_2$, etc, of equal width. Scheduling period $SP_1$ begins at time $T_0$ and ends at time $T_1$, while scheduling period $SP_2$ begins at time $T_1$ and ends at time $T_2$, and so on. (The same scheduling periods are tracked by system clocks within BTS 105 and CPE unit 112, which share a synchronized time base.)

The actual arrival times of individual ATM cells (as time stamped by the frame create module 330 in CPE unit 112 and extracted by the ATM cell extraction module 640) are indicated by $A_1$ through $A_5$. It is noted that there are two cell arrivals ($A_1$ and $A_2$) in scheduling period $SP_1$ and three cell arrivals ($A_3$, $A_4$ and $A_5$) in scheduling period $SP_2$. The recorded arrival time $A_k$ of the $k^{th}$ ATM cell is within plus or minus the jitter bound (denoted JB) of an ideal arrival time $Q_k$.

At step 710 of the algorithm, the calibrated arrival time $P_1$ of the $1^{st}$ cell is set to equal $T_0$, the start time of scheduling period $SP_1$. Of course, a different initial value for $P_1$ could be used.

At step 720, the arrival time $A_1$ of the $1^{st}$ cell is registered.

At step 730, no action is performed as $A_1$ and $P_1$ are within 1/PCR seconds of each other.

At step 740, equation (1) above is applied with k=1 in order to compute the calibrated arrival time of the second cell, denoted $P_2$. Specifically, $|A_1-P_1|$ is computed and is denoted by $\Delta_1$. Since $\Delta_1$ is greater than 2×JB, $N_1$ is set equal to $A_1$. Finally, $N_1$ is incremented by 1/PCR to yield $P_2$.

At step 750, k is incremented to 2 and the calibration unit waits to receive the arrival time $A_2$ of the $2^{nd}$ ATM cell.

At step 720, the arrival time $A_2$ of the $2^{nd}$ cell is recorded.

At step 730, no action is performed as $A_2$ and $P_2$ are relatively close.

At step 740, equation (1) above is applied with k=2 in order to compute the calibrated arrival time of the third cell, denoted $P_3$. Specifically, $|A_2-P_2|$ is computed and is denoted by $\Delta_2$. Since $\Delta_2$ is now less than 2×JB, $N_2$ is set equal to the half-way point between $A_2$ and $P_2$. Finally, $N_2$ is incremented by 1/PCR to yield $P_3$.

At step 750, k is incremented to 3 and the calibration unit waits to receive the arrival time $A_3$ of the $3^{rd}$ ATM cell.

At step 720, the arrival time $A_3$ of the $3^{rd}$ cell is registered.

At step 730, no action is performed as $A_3$ and $P_3$ are relatively close.

At step 740, equation (1) above is applied with k=3 in order to compute the calibrated arrival time of the fourth cell, denoted $P_4$. Specifically, $|A_3-P_3|$ is computed and is denoted by $\Delta_3$. Since $\Delta_3$ is less than 2×JB, $N_3$ is set equal to the half-way point between $A_3$ and $P_3$. Finally, $N_3$ is incremented by 1/PCR to yield $P_4$.

At step 750, k is incremented to 4 and the calibration unit waits to receive the arrival time $A_4$ of the $4^{th}$ ATM cell.

At step 720, the arrival time $A_4$ of the $4^{th}$ cell is registered.

At step 730, no action is performed as $A_4$ and $P_4$ are relatively close.

At step 740, equation (1) above is applied with k=4 in order to compute the calibrated arrival time of the fifth cell, denoted $P_5$. Specifically, $|A_4-P_4|$ is computed and is denoted by $\Delta_4$. Since $\Delta_4$ is less than 2×JB, $N_4$ is set equal to the half-way point between $A_4$ and $P_4$. Finally, $N_4$ is incremented by 1/PCR to yield $P_5$.

At step 750, k is incremented to 5 and the calibration unit waits to receive the arrival time $A_5$ of the $5^{th}$ ATM cell.

At step 720, the arrival time $A_5$ of the $5^{th}$ cell is registered.

At step 730, no action is performed as $A_5$ and $P_5$ are relatively close.

At step 740, equation (1) above is applied with k=5 in order to compute the calibrated arrival time of the fifth cell, denoted $P_6$. Specifically, $|A_5-P_1|$ is computed and is denoted by $\Delta_5$. Since $\Delta_5$ is less than 2×JB, $N_5$ is set equal to the half-way point between $A_5$ and $P_5$. Finally, $N_5$ is incremented by 1/PCR to yield $P_6$.

At step 750, k is incremented to 6 and the calibration unit waits to receive the arrival time $A_6$ of the $6^{th}$ ATM cell. The algorithm continues endlessly in this fashion.

Each new calibrated arrival time is fed to the unsolicited bandwidth allocation unit 680. Although calibrated arrival times are continuously generated by the calibration unit 670, not every such calibrated arrival time is used by the unsolicited bandwidth allocation unit 680. In fact, it is only once per scheduling period that the unsolicited bandwidth allocation unit 680 processes the most recently generated calibrated arrival time to produce a control message for transmission to CPE unit 112 and each other CPE unit sharing the same upstream link.

The control message destined for a particular CPE unit (e.g., CPE unit 112) during the current scheduling period contains bandwidth allocation information, such as the precise identity of the mini-slots to be used for upstream transmission of information during a future scheduling period. The number of mini-slots reserved in this way corresponds to the number of mini-slots occupied by a burst packet which contains frames that encapsulate the expected number of cell arrivals (at the frame create module 330) during the current scheduling period.

Figure 9:
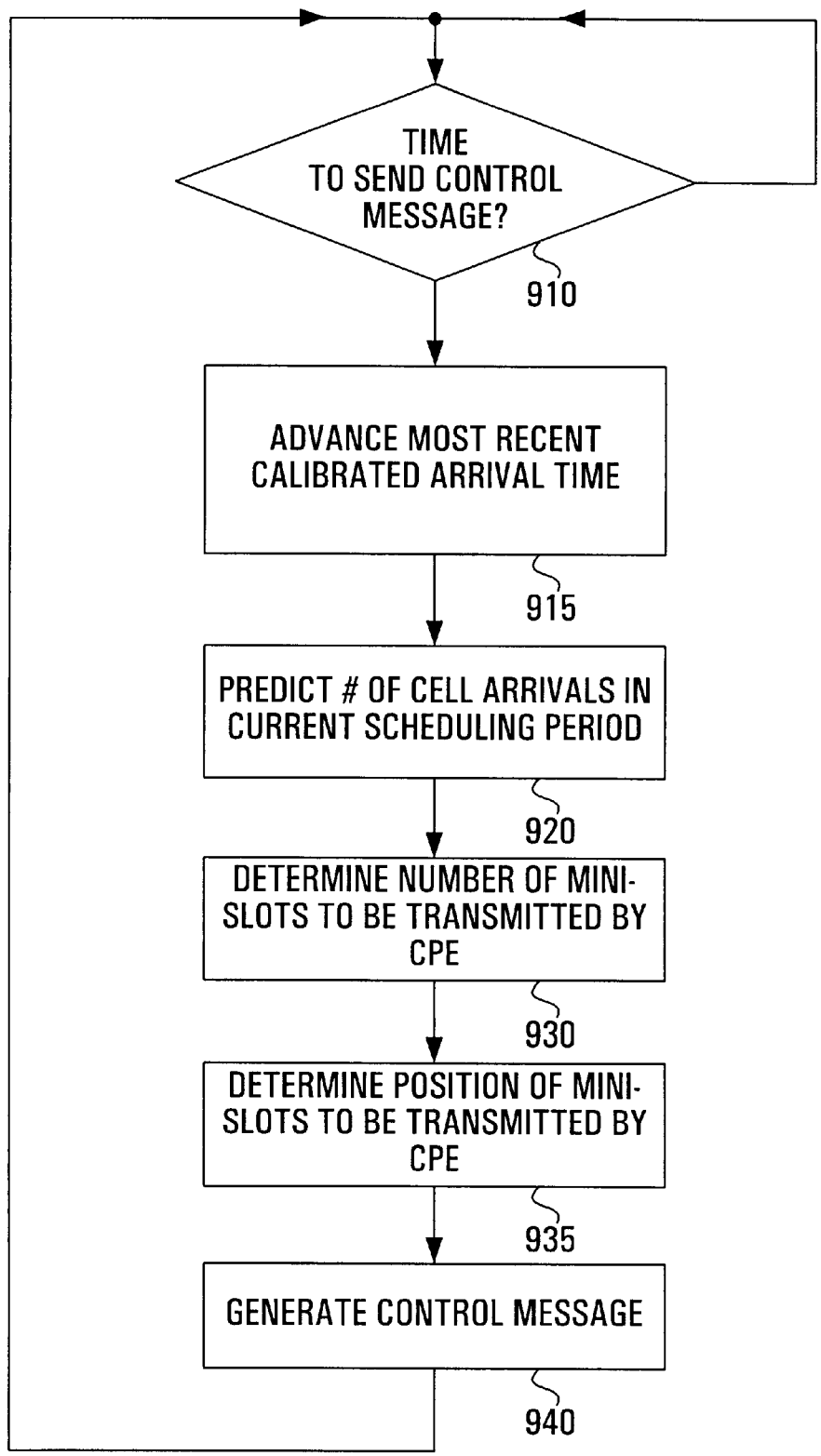
FIG. 9 is a flowchart illustrating operation of an unsolicited bandwidth allocation unit within the scheduler of FIG. 6.

Of course, it is to be noted that the current scheduling period is ahead in time relative to the most recently generated calibrated arrival time. This is because there is a delay between time stamping a cell (as performed by the frame create module 330 in CPE unit 112) and processing the arrival time of this cell (at the calibration unit 670). This delay is known by the unsolicited bandwidth allocation unit 680, which operates in a manner now described with reference to the flowchart in FIG. 9.

At step 910, the unsolicited bandwidth allocation unit 680 determines whether or not it is time to send a control message. For example, it may be desirable to send a control message at the beginning of each scheduling period. If the time to send a control message has been reached, the algorithm proceeds to step 920; otherwise, it returns to step 910.

At step 915, the unsolicited bandwidth allocation unit 680 advances the most recent calibrated arrival time in increments of 1/PCR until it is within the current scheduling period. In this way, the unsolicited bandwidth allocation unit 680 takes into account the difference in time between the most recent calibrated arrival time (supplied by the calibration unit 670) and the beginning of the current scheduling period.

Figure 10:
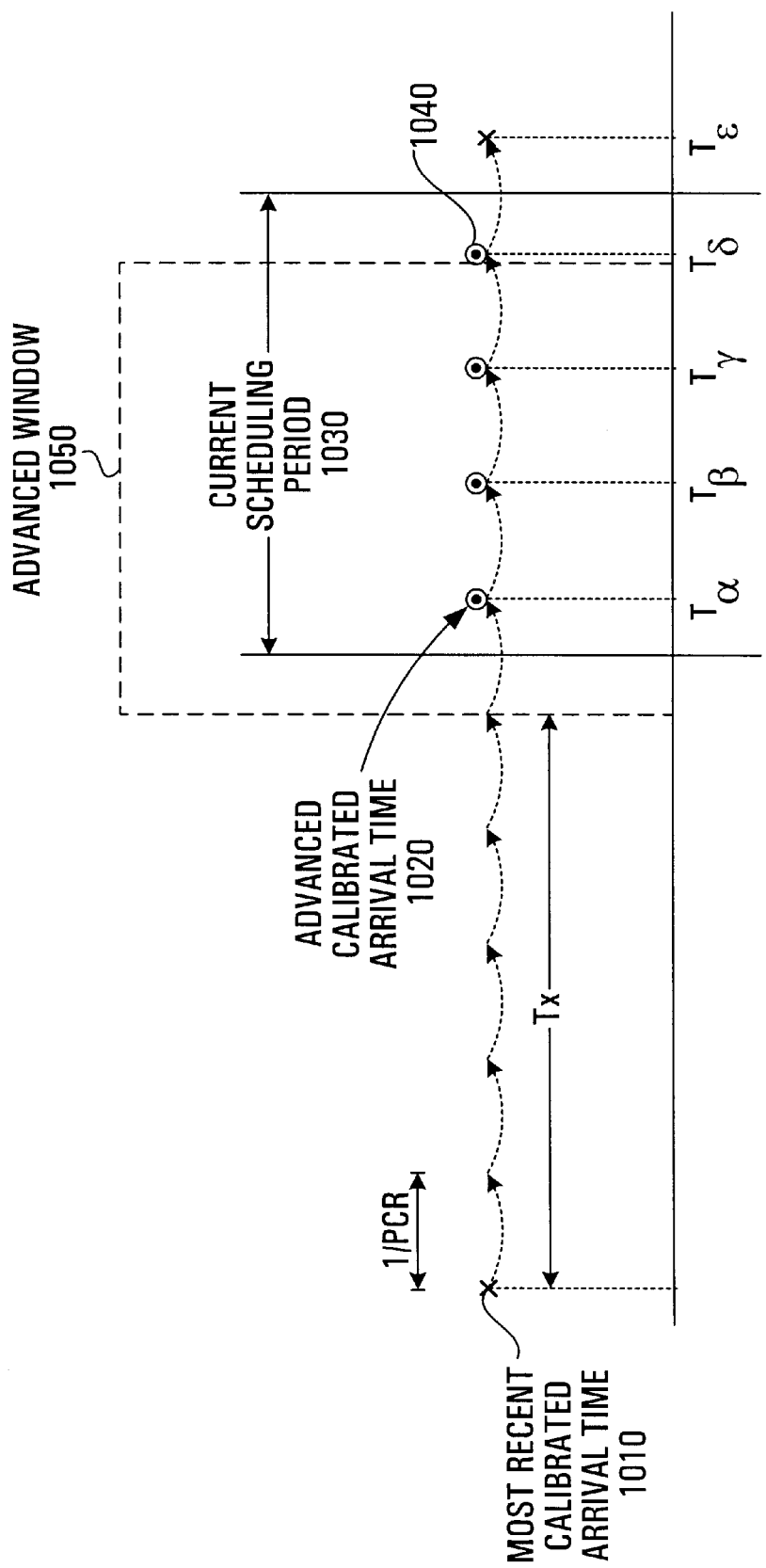
FIG. 10 is a time line that tracks various steps in the execution of the flowchart of FIG. 9 for a particular set of conditions.

By way of example, FIG. 10 shows a typical application of step 915. Specifically, the most recent calibrated arrival time 1010 is $T_x$ seconds behind the start of the current scheduling period 1030. According to step 915, the most recent calibrated arrival time 1010 is advanced in increments of 1/PCR seconds until the difference (denoted $T_y$) between the advanced calibrated arrival time 1020 and the beginning of the current scheduling period 1030 is positive and is less than 1/PCR.

At step 920, the unsolicited bandwidth allocation unit 680 predicts the number of cell arrivals in the current scheduling period. This can be achieved in many ways. For example, this may include counting the number of times that the advanced calibrated arrival time (found at step 915) can be further advanced while remaining within the bounds of the current scheduling period.

By way of example, FIG. 10 shows the application of step 920. Specifically, the advanced calibrated arrival time 1020 can be advanced three more times while remaining within the bounds of the current scheduling period 1030. Thus, the total number of ATM cells that are expected to arrive during the current scheduling period 1030 is four.

At step 930, the number of mini-slots required to transmit the expected number of cells is computed. This involves computing the number of mini-slots occupied by a burst packet which contains the MAC frames which encapsulate the expected number of ATM cells. Thus, if the MAC frames are created autonomously by the frame create module 330 in CPE unit 112, it is necessary to know how many such MAC frames will be created upon receipt of the expected number of ATM cells. Alternatively, the unsolicited bandwidth allocation unit 680 can set the terms for the creation of MAC frames at the CPE unit and can send MAC frame creation instructions to the CPE unit in the form of a control message. In any event, the required number of mini-slots can be computed.

At step 935, the position of the mini-slots required to transmit the expected number of cells is determined. This step is jointly executed for all CPE units sharing the same upstream link and is preferably computed once step 930 has been performed for all such CPE units. Specifically, the available number of upstream mini-slots in a scheduling period is distributed among the various CPE units according to the number of mini-slots required (as determined from having executed step 930 for each CPE unit). If the total required number of mini-slots is greater than the total available number of mini-slots, then an error condition indicating over-provisioning may be signalled to other parts of the BTS 105.

Finally, at step 940, the total number of mini-slots computed at step 930 and their assigned positions computed at step 935 are encoded into a control message sent to CPE unit 112 via modulator 620, IF/RF interface 610 and wireless link 120.

Due to the functioning of the calibration unit 670, the calibrated arrival times of ATM cells arriving at the frame create module 330 are closer to the actual arrival times than would be the case if no calibration algorithm were used. In addition, due to the functioning of the unsolicited bandwidth allocation unit 680, the number of cell arrivals during a particular scheduling period can be accurately predicted, leading to an accurate prediction of the upstream bandwidth required to transmit these cells. As a result, the invention provides an increase in bandwidth utilization efficiency as well as a decrease in the cell loss ratio relative to conventional methods.

In the preferred embodiment, the number of cell arrivals is estimated within the exact boundaries of the current scheduling period. In the case of FIG. 10, the arrival of the last cell 1040 in scheduling period 1030 is expected to occur at time $T_8$. However, this cell 1040 may be subject to so much jitter that it arrives in the next scheduling period. If this possibility is not taken into account, bandwidth will be allocated for cell 1040 but this bandwidth will be unused, i.e., wasted.

Thus, it may be preferable to estimate the number of cell arrivals in a slightly shifted (e.g., advanced) version of the current scheduling period. In the case of a slightly time-advanced window, shown at 1050 in FIG. 10, the actual arrival of the last cell 1040 (estimated to be at time $T_8$) will be missed and this cell's arrival will have to be accounted for when estimating the number of cell arrivals in the next scheduling period. This results in an additional one-scheduling-period delay before cell 1040 is transmitted by the CPE unit. Nevertheless, such a delay resulting from use of an advanced window may be preferable over the bandwidth wastage that may result from use of a non-advanced window.

According to another alternative embodiment of the invention, MAC frames can be dispensed with entirely. For example, ATM cells could be directly arranged into burst packets at the frame create module 330 without having to be first arranged into MAC frames. Thus, the operation performed by the unsolicited bandwidth allocation unit 680 may simply involve the computation of the number of mini-slots which make up a burst packet that contains the expected number of ATM cells.

According to yet another alternative embodiment of the invention, the time difference between the most recent calibrated arrival time and the beginning of the current scheduling period could be accounted for by the calibration unit 670 itself. For example, in FIG. 10, the advanced calibrated arrival time 1020 could be computed by the calibration unit 670 and it is this advanced version of the calibrated arrival time which could be supplied to the unsolicited bandwidth allocation unit 680 along control link 675.

In the preferred embodiment, of the present invention, $P_1$ (i.e. the calibrated arrival time of the first ATM cell) is initialized to $T_0$ in step 710 of the calibration algorithm of FIG. 7. However, this may result in a poor estimate of the arrival time of the first ATM cell at the frame create module 330, which may adversely affect the cell loss ratio or the bandwidth utilization. In severe cases, the scheduler could even declare lost cells. A better estimate can be obtained by having the BTS 105 and the CPE unit 112 participate in an initial calibration algorithm.

The term "initial calibration" applies to the synchronization of the scheduler 660 with the arrival times of cells at the frame create module 330 on a per-VC (virtual circuit) basis. Initial calibration takes place between the scheduler 660 in the BTS 105 and the frame create module 330 in CPE unit 112. Thus, it is assumed that a link exists between the data processing unit 380 and the frame create module 330.

Figure 11:
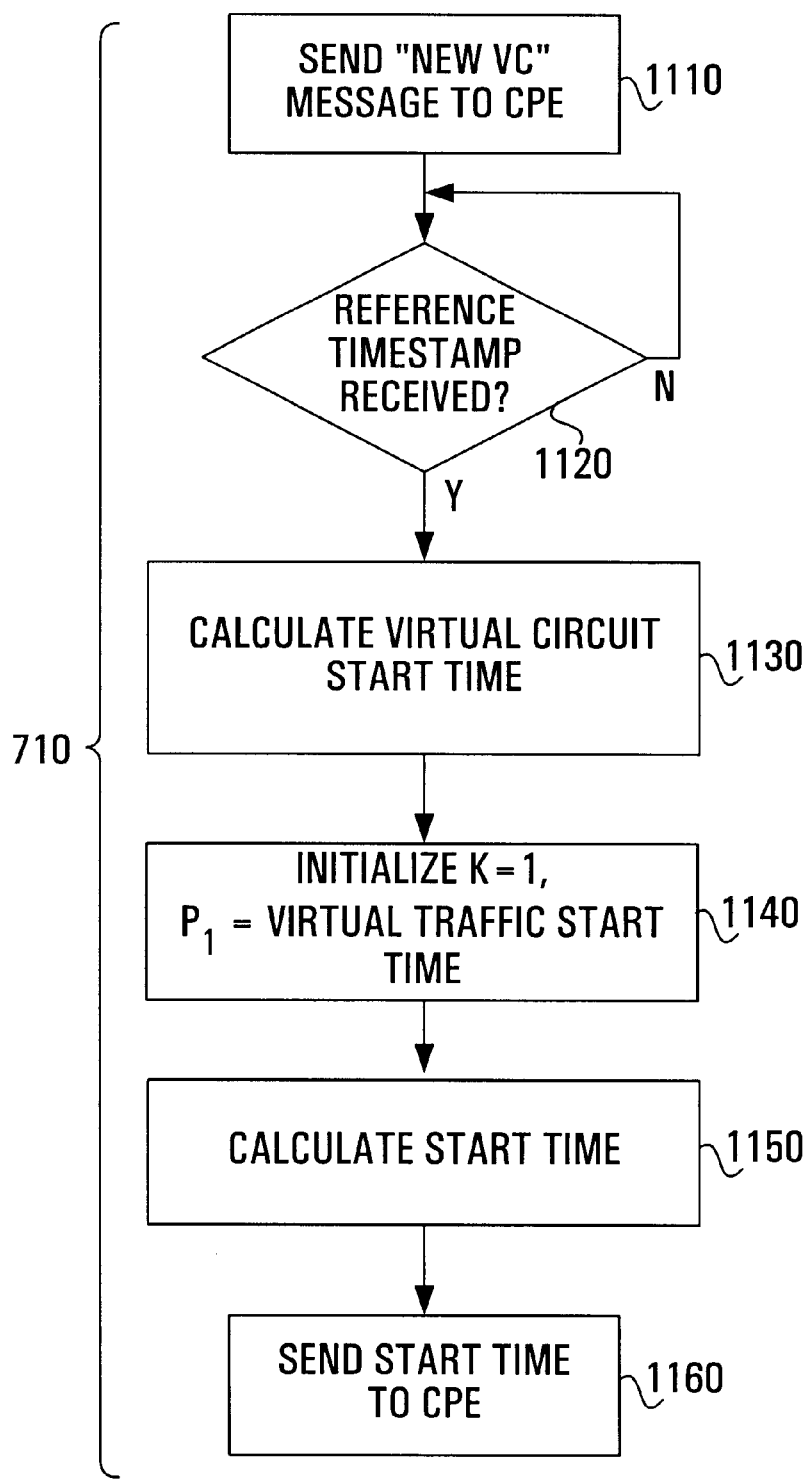
FIG. 11 is a flowchart illustrating an initial calibration algorithm executed at the BTS.
Figure 12:
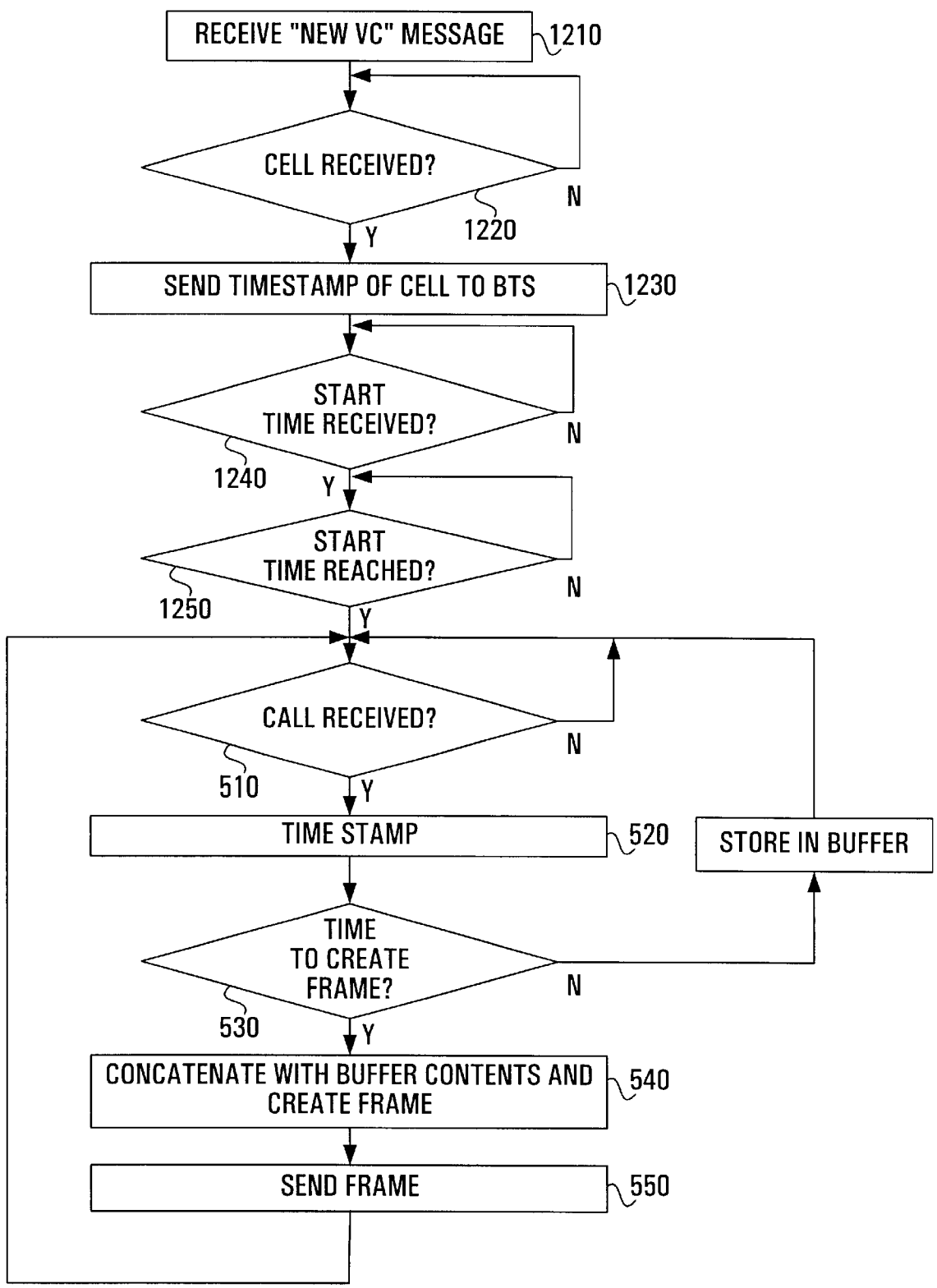
FIG. 12 is a flowchart illustrating an initial calibration algorithm executed at the CPE unit.

When the BTS 105 establishes a virtual connection with CPE unit 112, the following sequence of events results in initial calibration. FIG. 11 shows a flowchart of the events occurring at the calibration unit 670 in the BTS 105 which are intended to replace step 710 of FIG. 7. FIG. 12 shows a flowchart of the events occurring at the frame create module 330 in CPE unit 112.

With reference to FIGS. 11 and 12, at step 1110, the calibration unit 670 first sends a "new VC" message to CPE unit 112 to that CPE unit which will maintain the new virtual connection (e.g., CPE unit 112).

Upon receipt of the "new VC" message (STEP 1210), the frame create module 330 in CPE unit 112 will time stamp the next cell received from the AAL1 software unit 320 (STEP 1220). This time stamp is called the reference time stamp and is sent upstream to the BTS 105 (STEP 1230). No centralized bandwidth allocation is required at this stage, since only a small amount of control information (the reference time stamp) is being sent upstream.

Upon receipt of the reference time stamp by the calibration unit 670 (STEP 1120), the calibration unit 670 estimates the arrival time of some cell in the future (STEP 1130). This arrival time may be termed the "virtual traffic start time". The virtual traffic start time is preferably not the estimated arrival time of the next ATM cell arriving at the CPE unit. Rather, the virtual traffic start time is the estimated arrival time of some cell which could be 8, 16 or generally N cells away. This time gap is beneficial in order to permit the CPE unit to prepare itself for processing new virtual circuit traffic.

In order to compute the virtual circuit start time, the calibration unit 670 takes the reference time stamp and adds to it N*1/PCR. It is recalled that 1/PCR is the average interval between cells and is known. At STEP 1140, $P_1$ (the estimated arrival time of the first ATM cell) is set to the virtual circuit start time. Also, for completeness, k is initialized to 1.

At STEP 1150, the calibration unit 670 computes the "start time", which is the time at which the CPE unit 112 should begin buffering cells for upstream transmission. The start time is preferably slightly before the virtual circuit start time.

Next, at step 1160, the calibration unit transmits the start time to the CPE unit 112 in a downstream packet. This can be achieved directly via the modulator 620 or in any other suitable way.

At the CPE unit 112, the frame create module 330 waits to receive the start time from the BTS (STEP 1240). If the start time has been reached, then the CPE begins buffering cells for upstream transmission (STEP 1250), otherwise, it waits for the start time to be reached. Preferably, all cells which arrive between the reference time and the start time will be discarded by the CPE unit 112.

The next upstream cell received by the frame create module 330 will be time stamped by its actual arrival time $A_1$ and when this arrival time $A_1$ is received by the calibration unit 670, it will be compared to $P_1$ in the previously described manner. Advantageously, no "cell loss" condition will be declared at step 730 if $P_1$ has been computed using the above-described initial calibration algorithm.

While the preferred embodiment of the invention has been described and illustrated, those skilled in the art will appreciate that numerous modifications and variations can be made without departing from the scope of the invention as defined in the appended claims.

We claim:

1. A method of allocating bandwidth in a communications system, comprising:

receiving a plurality of actual arrival times associated with respective data units;

determining, as a function of the received actual arrival times, a number of data units expected to have actual arrival times in a time interval beginning after the most recently received actual arrival time; and allocating sufficient bandwidth to transmit the expected number of data units.

2. A method as claimed in claim 1, wherein the step of determining the expected number of data units comprises:

determining a calibrated arrival time of a subsequent data unit;

advancing the calibrated arrival time by constant increments until it is within said time interval; and setting the expected number of data units equal to one plus the number of times that the advanced calibrated arrival time can be further advanced while remaining within said time interval.

3. A method as claimed in claim 2, wherein the step of determining the calibrated arrival time of the subsequent data unit comprises:

comparing the actual arrival time of a previous data unit with a calibrated arrival time of the previous data unit; and if the actual arrival time of the previous data unit is within a predetermined range of the calibrated arrival time of the previous data unit, creating the calibrated arrival time of the subsequent data unit by: computing a function of the actual arrival time and the calibrated arrival time of the previous data unit; and advancing the result by said increment;

otherwise, creating the calibrated arrival time of the subsequent data unit by advancing the actual arrival time of the previous data unit by said increment.

4. A method as claimed in claim 3, wherein said function is the mean.

5. A method as claimed in claim 3, wherein the calibrated arrival time of the first data unit is initialized to a predetermined reference time.

6. A method as claimed in claim 3, wherein the calibrated arrival time of the first data unit is initialized to a value computed from an initial calibration procedure, said procedure comprising the steps of:

prior to the first scheduling period, requesting a first arrival time from a remote communications device;

upon receipt of the first arrival time from the remote communications device, advancing the first arrival time by multiples of said increment until it is within the first scheduling period.

7. A method as claimed in claim 1, wherein the step of determining the expected number of data units comprises:

determining a calibrated arrival time of a subsequent data unit;

advancing the calibrated arrival time by constant increments until it is within less than one increment of said time interval; and setting the expected number of data units equal to the number of times that the advanced calibrated arrival time can be advanced by said increments while remaining within said time interval.

8. A method as claimed in claim 7, wherein the step of determining the calibrated arrival time of the subsequent data unit comprises:

comparing the actual arrival time of a previous data unit with a calibrated arrival time of the previous data unit; and if the actual arrival time of the previous data unit is within a predetermined range of the calibrated arrival time of the previous data unit, creating the calibrated arrival time of the subsequent data unit by: computing a function of the actual arrival time and the calibrated arrival time of the previous data unit; and advancing the result by said increment;

otherwise, creating the calibrated arrival time of the subsequent data unit by advancing the actual arrival time of the previous data unit by said increment.

9. A method as claimed in claim 8, wherein said function is the mean.

10. A method as claimed in claim 8, wherein the calibrated arrival time of the first data unit is initialized to a predetermined reference time.

11. A method as claimed in claim 8, wherein the calibrated arrival time of the first data unit is initialized to a value computed from an initial calibration procedure, said procedure comprising the steps of:

prior to the first scheduling period, requesting a first arrival time from a remote communications device;

upon receipt of the first arrival time from the remote communications device, advancing the first arrival time by multiples of said increment until it is within the first scheduling period.

12. A method as claimed in claim 1, further comprising:
transmitting a control message to a remote communications device, said control message comprising an indication of the amount of bandwidth allocated in the step of allocating sufficient bandwidth.

13. A method as claimed in claim 1, wherein bandwidth is measured in time slots and wherein the step of allocating sufficient bandwidth comprises:
determining a number of frames required for encapsulating the number of data units expected to arrive in said time interval; and
determining the number of time slots required to transmit all frames found to be required for encapsulating.

14. A method as claimed in claim 13, further comprising:
transmitting a control message to a remote communications device, said control message specifying said number of time slots.

15. A method as claimed in claim 14, further comprising:
for each of a plurality of remote communications devices, determining the position of the time slots to be used by each remote communications device for transmitting the data units expected to arrive in said time interval.

16. A method as claimed in claim 15, wherein the control message sent to remote communications device specifies said position of the time slots to be used by said remote communications device.

17. A method as claimed in claim 1, wherein bandwidth is measured in time slots and wherein the step of allocating sufficient bandwidth comprises:
determining a number of time slots required to transmit the number of data units expected to arrive in said time interval.

18. A method as claimed in claim 17, further comprising:
transmitting a control message to a remote communications device, said control message specifying said number of time slots.

19. A method as claimed in claim 18, further comprising:
for each of a plurality of remote communications devices, determining the position of the time slots to be used by said remote communications device for transmitting the data units expected to arrive in said time interval.

20. A method as claimed in claim 19, wherein the control message sent to a remote communications device specifies said position of the time slots to be used by said remote communications device.

21. An article of manufacture, comprising:
a computer usable medium having computer readable program code means embodied therein for causing bandwidth to be allocated in a communications system, the computer readable program code means in said article of manufacture comprising:
computer readable program code means for causing a computer to receive a plurality of actual arrival times associated with respective data units;
computer readable program code means for causing the computer to determine, as a function of the actual arrival times, a number of data units expected to have actual arrival times in a time interval beginning after the most recently received actual arrival time; and
computer readable program code means for causing the computer to allocate sufficient bandwidth to transmit the expected number of data units.

22. A method of allocating bandwidth for transmitting data units from a first communications device to a second communications device in a communications system, comprising:
the first device determining arrival time information associated with each data unit;
the first device sending arrival time information associated with at least one data unit to the second device;
the second device allocating future bandwidth to the first device as a function of the arrival time information received from the first device;
the second device sending information to the first device, said information specifying the allocated future bandwidth; and
the first device grouping a number of the data units into a burst packet occupying the allocated bandwidth and sending the burst packet to the second device.

23. A method as claimed in claim 22, wherein bandwidth is allocated as a number of time slots to be used by the first device in a future scheduling period and wherein the step of the second device allocating future bandwidth comprises the second device estimating the number of data units arriving at the first device in the current scheduling period and determining the number of time slots required to transmit a burst packet encapsulating the estimated number of data units.

24. A method as claimed in claim 23, wherein said future scheduling period is at least one scheduling period away from the current scheduling period.

25. A method as claimed in claim 22, wherein the step of the first device grouping a number of the data units into a burst packet further comprises encoding arrival time information associated with each data unit in the burst packet within the burst packet.

26. A method as claimed in claim 22, wherein each data unit comprises a header and a payload and wherein the step of the first device grouping a number of the data units into a burst packet further comprises encoding arrival time information associated with each data unit in the header of each data unit.

27. A method as claimed in claim 26, wherein the data units are ATM cells.

28. A scheduler, comprising:
a calibration unit for receiving arrival time information associated with a plurality of data units and for determining, as a function of the arrival time information, a calibrated arrival time for a next data unit; and
an unsolicited bandwidth allocation unit connected to the calibration unit, for determining, as a function of the calibrated arrival time for the next data unit, the number of data units expected to arrive in a time interval and for allocating sufficient bandwidth to accommodate the expected number of data units.

29. A communications device, comprising:
a data unit extraction module, for extracting the actual arrival time associated with each of a plurality of data units; and
a scheduler connected to the data unit extraction module, for receiving the actual arrival times from the data unit extraction module; determining, as a function of the actual arrival times, a number of data units expected to arrive in a time interval beginning after the most recently received actual arrival time; and allocating sufficient bandwidth to transmit the expected number of data units.

30. A communications device, comprising:

a frame create module, for receiving data units from a data unit generation module, determining arrival time information associated with each data unit, organizing the data units into frames and encoding the frame with the arrival time information of each data unit so organized; and a burst create module connected to the frame create module, for receiving, during each of a plurality of successive scheduling periods, instructions to transmit frames during a specified set of time slots in a specified scheduling period; creating a burst packet from the frames, wherein the burst packet occupies the number of time slots in the specified set of time slots; arranging the burst packet to fit into the specified set of time slots; and transmitting the burst packet in the specified set of time slots in the specified scheduling period.

* * * * *